(12) United States Patent
Kirkpatrick (10) Patent No.: US 9,733,934 B2
(45) Date of Patent: Aug. 15, 2017

(54) DETECTING APPLICATION SIMILARITY (75) Inventor: Ficus Kirkpatrick, San Francisco, CA (US)

(73) Assignee: Google Inc., Mountain View, CA (US)

(*) Notice: Subject to any disclaimer, the term of this patent is extended or adjusted under 35 U.S.C. 154(b) by 456 days.

(21) Appl. No.: 13/043,214

(22) Filed: Mar. 8, 2011

(65) Prior Publication Data

US 2012/0233163 A1   Sep. 13, 2012

(51) Int. Cl.
*G06F 17/30* (2006.01)
*G06F 9/44* (2006.01)
*G06Q 30/02* (2012.01)
*H04W 4/00* (2009.01)

(52) U.S. Cl.
CPC .......... *G06F 8/77* (2013.01); *G06F 17/30386* (2013.01); *G06Q 30/02* (2013.01); *H04W 4/003* (2013.01)

(58) Field of Classification Search
CPC .................................. G06F 17/30386
USPC ................ 707/731, 736, 737, 748, 749, 758
See application file for complete search history.

(56) References Cited

U.S. PATENT DOCUMENTS

| 7,185,001 | B1* | 2/2007 | Burdick et al. | |
| 8,179,321 | B2 | 5/2012 | Rani et al. | |
| 8,452,797 | B1 | 5/2013 | Paleja et al. | |
| 8,468,164 | B1 | 6/2013 | Paleja et al. | |
| 8,862,715 | B1 | 10/2014 | Tom et al. | |
| 2003/0217052 | A1* | 11/2003 | Rubenczyk et al. | 707/3 |
| 2005/0268338 | A1* | 12/2005 | Made | 726/24 |
| 2007/0112754 | A1* | 5/2007 | Haigh et al. | 707/5 |
| 2007/0226324 | A1* | 9/2007 | Branda et al. | 709/223 |
| 2008/0033922 | A1* | 2/2008 | Cisler et al. | 707/3 |
| 2008/0086775 | A1* | 4/2008 | Repasi et al. | 726/24 |
| 2008/0201466 | A1 | 8/2008 | Adelman et al. | |
| 2010/0205274 | A1* | 8/2010 | Gharabally et al. | 709/217 |
| 2011/0041078 | A1* | 2/2011 | Park et al. | 715/746 |
| 2011/0208801 | A1* | 8/2011 | Thorkelsson et al. | 709/203 |
| 2011/0307354 | A1 | 12/2011 | Erman et al. | |
| 2012/0077470 | A1 | 3/2012 | Kim et al. | |
| 2012/0095979 | A1 | 4/2012 | Aftab et al. | |
| 2012/0233165 | A1 | 9/2012 | Kirkpatrick | |
| 2012/0323898 | A1 | 12/2012 | Kumar et al. | |

(Continued)

FOREIGN PATENT DOCUMENTS

EP   2224336 A1   9/2010

OTHER PUBLICATIONS

International Search Report and Written Opinion of international application No. PCT/US2012/027553, dated Apr. 10, 2012, 11 pp.

(Continued)

*Primary Examiner* — Grace Park
(74) *Attorney, Agent, or Firm* — Shumaker & Sieffert, P.A.

(57) ABSTRACT

The subject matter of this disclosure can be implemented in, among other things, a method. In these examples, the method includes selecting for analysis by a computing device, an executable application, and identifying a group of application programming interfaces (APIs) utilized by the application when the application is executed. The method may also identifying a group of related applications that are each related to the application based on the group of APIs utilized by the application, wherein each related application of the group of related applications utilizes one or more APIs of the group of APIs utilized by the application.

19 Claims, 4 Drawing Sheets

(56) References Cited

U.S. PATENT DOCUMENTS

| | | |
|---|---|---|
| 2013/0006675 A1 | 1/2013 | Bowne et al. |
| 2013/0014040 A1 | 1/2013 | Jagannathan et al. |
| 2013/0014146 A1 | 1/2013 | Bhatia et al. |
| 2013/0124449 A1 | 5/2013 | Pinckney et al. |
| 2013/0268485 A1 | 10/2013 | Cao et al. |
| 2013/0290369 A1 | 10/2013 | Sayers et al. |
| 2014/0052683 A1 | 2/2014 | Kirkham et al. |
| 2014/0059231 A1 | 2/2014 | Choi et al. |
| 2014/0108792 A1 | 4/2014 | Borzycki et al. |
| 2014/0280131 A1 | 9/2014 | Martens et al. |

OTHER PUBLICATIONS

Office Action from U.S. Appl. No. 13/250,592, dated Jan. 18, 2012, 20 pp.
Response to Office Action dated Jan. 18, 2012, from U.S. Appl. No. 13/250,592, filed Apr. 18, 2012, 11 pp.
International Preliminary Report on Patentability of International Application No. PCT/US2012/027553, mailed Sep. 19, 2013, 8 pp.
Office Action dated May 24, 2012, from U.S. Appl. No. 13/250,592, 22 pp.
Response to Office Action dated May 24, 2012, from U.S. Appl. No. 13/250,592, filed Jul. 23, 2012, 12 pp.
Office action from U.S. Appl. No. 13/250,592, dated Nov. 20, 2013, 21 pp.
Response to Office Action from U.S. Appl. No. 13/250,592, filed Feb. 12, 2013, 11 pp.
Final Office Action from U.S. Appl. No. 131250,592, dated May 5, 2014, 23 pp.
Response to Final Office Action dated May 5, 2014, from U.S. Appl. No. 13/250,592, filed Jul. 24, 2014, 17 pp.
Advisory Action from U.S Appl. No. 13/250,592, dated Aug. 14, 2014, 3 pp.
Appeal Brief from U.S. Appl. No. 13/250,592, filed Nov. 5, 2014, 27 pp.
Examiner's Answer from U.S. Appl. No. 13/250,592, dated Dec. 22, 2014, 11 pp.
Reply Brief from U.S. Patent Appl. No. 13/250,592, filed Feb. 23, 2015, 10 pp.
Decision on Appeal from U.S. Appl. No. 13/250,592, dated Dec. 14, 2016, 8 pp.
Communication pursuant to Article 94(3) EPC from counterpart European Application No. 12 708 232.9-1954 dated Jul. 5, 2016, 4 pp.
Response to Communication pursuant to Article 94(3) EPC dated Jul. 5, 2016 from counterpart European Application No. 12 708 232.9-1954 filed Oct. 28, 2016, 7 pp.

* cited by examiner

DETECTING APPLICATION SIMILARITY

TECHNICAL FIELD

This disclosure relates to software applications executing on computing devices and, more particularly, identifying software applications that may be similar to a specified software application.

BACKGROUND

From time to time, a user of a computing device may search for applications to install on a computing device. When the user browses an online application store, it may be difficult for the user to find applications the user is looking for without knowing the exact name of the application. Furthermore, it may be difficult for the user to find applications related to a particular application (e.g., applications that may offer similar functionality as or may compete with the particular application).

One conventional solution is to identify related applications based on metadata included with the applications, such as the application description. Application metadata is typically entered by the programmer of the application. Thus, identifying related applications based on metadata may rely upon different programmers describing similar applications in a similar manner in order to be an effective tool. If one programmer utilizes a different word or phrase than another programmer to describe a common feature, the two applications may not be identified as related applications despite actually being related applications. The conventional approach may also result in applications being identified as related applications even though the applications may not be related at all.

SUMMARY

In general, this disclosure describes techniques for identifying similar software applications based on programmed characteristics of the software applications. The techniques involve analyzing the programmed characteristics of the software applications to identify applications that may have one or more similar programmed characteristics. Applications that include one or more similar programmed characteristics may be classified as related applications. The techniques of this disclosure may also provide a manner in which two or more different programmed characteristics of the software applications may be analyzed individually and then combined to determine whether or not applications may be related. In some examples, a weighting may be applied to each programmed characteristic that is analyzed such that certain programmed characteristics that may be more likely to accurately identify related applications are given a greater weighting than those programmed characteristics that may be less likely to accurately identify related applications.

In one example, a method includes selecting, by a computing device, an executable application, and identifying a group of application programming interfaces (APIs) utilized by the application when the application is executed. The method also includes identifying a group of related applications that are each related to the application based on the group of APIs utilized by the application, wherein each related application of the group of related applications utilizes one or more APIs of the group of APIs utilized by the application.

In another example, a computer-readable medium is encoded with instructions. The instructions cause one or more programmable processors of a computing system to select for analysis, by the computing system, an executable application, and identify a group of application programming interfaces (APIs) utilized by the application when the application is executed. The instructions further cause the one or more programmable processors to identify a group of related applications that are each related to the application based on the group of APIs utilized by the application, wherein each related application of the group of related applications utilizes one or more APIs of the group of APIs utilized by the application.

In another example, a computing system includes one or more programmable processors, an application analysis module, and means for identifying a group of related applications that are each related to the application based on the group of APIs utilized by the application, wherein each application of the group of related applications utilizes one or more APIs of the group of APIs utilized by the application. The application analysis module is executable by the one or more programmable processors to select an application for analysis, and identify a group of application programming interfaces (APIs) utilized by the application.

In this manner, the techniques of this disclosure may enable, in various instances, more accurate identification of related applications based on programmed characteristics of the applications. By utilizing programmed characteristics of the applications, the techniques may not need to rely upon various programmers describing an application in a similar manner. Furthermore, utilizing multiple programmed characteristics when analyzing the applications may result in a still more accurate relatedness determination, particularly when combined with configurable weighting factors for each programmed characteristic included in the determination and/or filtering techniques. By more accurately identifying related applications, the discoverability of new applications by users may be improved, which may lead to an improved end-user experience when using an online application store, as one example. As another example, if a security researcher discovers a piece of malicious software, the techniques of this disclosure may aid in identifying other applications that have a higher probability of also being malicious, which may enable an administrator to more quickly remove the malicious software and minimize the impact of the malicious software.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
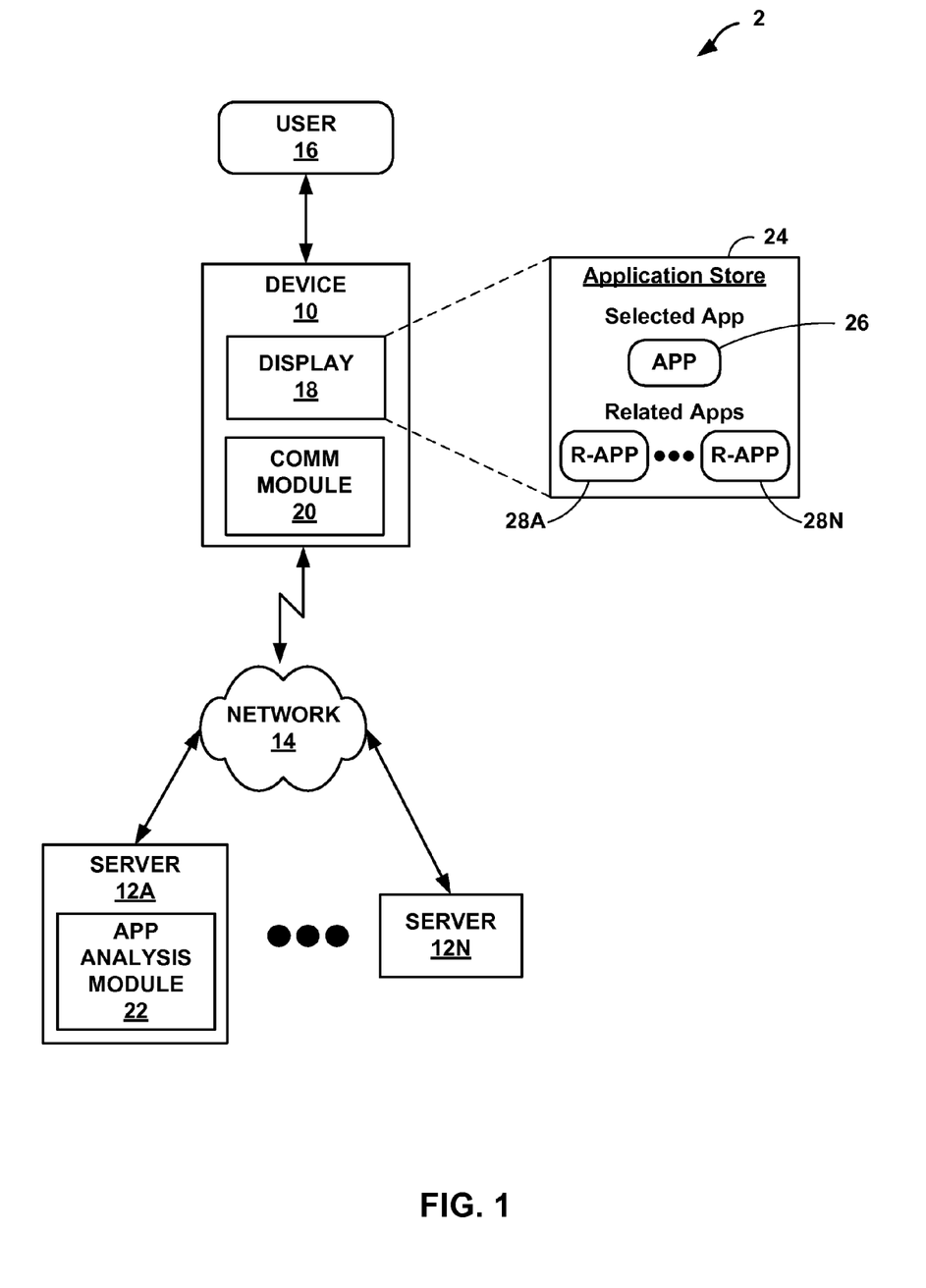
FIG. 1 is a conceptual diagram illustrating one example network system with an example user interface displayed, in accordance with one or more aspects of the present disclosure.

FIG. 1 is a conceptual diagram illustrating one example system 2 with an example user interface 24 displayed, in accordance with one or more aspects of the present disclosure. As shown in FIG. 1, system 2 includes device 10, servers 12A-12N (collectively, "servers 12"), and network 14. Examples of device 10 include, but are not limited to, portable or mobile devices such as cellular phones, personal digital assistants (PDAs), laptop computers, tablet computers, portable gaming devices, portable media players, e-book readers, watches, as well as non-portable devices such as desktop computers. For purposes of illustration only in this disclosure, device 10 is described as a portable or mobile device that a user can carry, but aspects of this disclosure should not be considered limited to portable or mobile devices.

Device 10 and servers 12 are coupled to network 14 via wired and/or wireless links. Device 10 may send data to or receive data from servers 12 via network 14. Network 14 may include a wide-area network such as the Internet, a local-area network (LAN), an enterprise network, a wireless network, a cellular network, a telephony network, a Metropolitan area network (e.g., Wi-Fi, WAN, or WiMAX), one or more other types of networks, or a combination of two or more different types of networks (e.g., a combination of a cellular network and the Internet). Servers 12 may be any of several different types of network devices. For instance, servers 12 may be conventional web servers, specialized media servers, personal computers operating in a peer-to-peer fashion, or other types of network devices. In some examples, one or more of servers 12 may host an online application store, such as the Android™ Market, that may offer applications for download or purchase to user 16.

Device 10 may include a display 18, and a communications module (COMM MODULE) 20. Display 18 may be a liquid crystal display (LCD), e-ink, or other display. Display 18 presents the content of device 10 to user 16. For example, display 18 may present the applications executed on device 10 such as a web browser or a video game, content retrieved from servers 12, and other functions that may need to be presented to user 16. As another example, display 18 may be a touch screen or a presence-sensitive device that allows user 16 to interact with device 10.

In some examples, any application executed on device 10 may require data from one or more of servers 12. Communications module 20 transmits a request for the data and receives the data from one or more of servers 12. Communications module 20 may provide the received data to device 10 for further processing. Communications module 20 is configured to transmit data/requests to and receive data/responses from one or more servers 12 via network 14. Communications module 20 may support wireless or wired communication, and includes appropriate hardware and software to provide wireless or wired communication. For example, communications module 20 may include an antenna, modulators, demodulators, amplifiers, and other circuitry to effectuate communication between device 10 and one or more of servers 12.

User 16 may interact with device 10 via display 18 to perform various functions. For example, user 16 may cause device 10 to execute an application that presents an online application store to user 16 via display 18. In one example, user 16 may execute a web browser and navigate to a web-based online application store. In another example, user 16 may execute an application that includes online application store functionality. The online application store may allow user 16 to browse, search, select, purchase, download, and install various applications on device 10. In some examples, one or more of servers 12 may host the online application store. In these examples, communications module 20 may receive data from servers 12 including application descriptions, search results, and the content of one or more applications user 16 selects to download and/or install on device 10 via network 14.

User interface 24 is one example of a user interface that may be displayed to user 16 via display 18 upon user 16 visiting an online application store. In the example of user interface 24, user 16 selected the application represented by application icon (APP) 26. In the examples where one or more of servers 12 (e.g., server 12A) hosts the online application store, the related applications (R-APPs) 28A-28N (collectively, "related applications 28") may be identified by server 12A as being related to the selection application.

In accordance with the techniques of this disclosure, related applications 28 may be identified by server 12A based on one or more different criteria, including various programmed characteristics. In general, server 12A may analyze one or more of the applications offered through the online application store to determine the programmed characteristics of the applications. The applications analyzed by server 12A may be grouped into one or more different application corpuses and may be offered in one or more different application stores. The programmed characteristics analyzed may include, but are not limited to, programmed application behavior (e.g., network calls and resource utilization), application programming interfaces (APIs) utilized by the application, colors included in the graphics, images, or other visual elements of the application, or images included in the application, and the size (e.g., the number of bytes) of the application. By analyzing the programmed characteristics, related applications may be more accurately identified because, rather than relying on different developers describing the application, the application itself is analyzed.

As shown in FIG. 1, server 12A includes an application analysis module (APP ANALYSIS MODULE) 22 that analyzes the programmed characteristics of applications. When a program is made available via the online application store, as one example, application analysis module 22 analyzes the application to determine the programmed characteristics. For example, application analysis module 22 may deconstruct the compiled binary application to determine which APIs or libraries the application calls, includes, or otherwise makes reference to in order to perform the functionality of the application. Shared application libraries or open source application libraries may be particularly helpful in identifying an application's functionality as the functionality provided by the shared or open source libraries may be well-known.

Upon determining which APIs are utilized by each application, application analysis module 22 may aggregate the usage information for each API from all or a subset of the applications analyzed by application analysis module 22 or other application analysis modules that may be installed on others of servers 12. Upon aggregating the API usage information, application analysis module 22 may perform a statistical analysis of all of the APIs included in the aggregated data. For APIs that are very commonly or very rarely used by the analyzed applications, application analysis module 22 may consider those APIs as outliers and remove them from a relatedness determination in an attempt to increase the accuracy of the relatedness determination.

In accordance with one or more aspects of this disclosure, application analysis module 22 may apply a configurable threshold in order to determine if an application is related to one or more other applications. In examples where the application analysis module 22 is configured to make the relatedness determination based on API usage, the configurable threshold may relate to the number of APIs two different applications must have in common before the two applications may be determined to be related applications. In various instances, application analysis module 22 may determine the relatedness of two applications along a continuum that moves from slightly related (e.g., only one API in common) to highly related (e.g., multiple APIs in common).

In another example, certain APIs may be determined to be more accurate indicators of relatedness (e.g., when specific, well-known functionality is attributed to the certain APIs). Application analysis module 22 may apply a weighting to each API based on how closely each API correlates with the likelihood that two applications that each utilize the particular API are related. That is, application analysis module 22 may apply a heavier weighting to APIs that are more likely to indicate that two applications are related (e.g., two applications utilizing an API associated with a social network or microblogging server) than to APIs that are less likely to indicate that two applications are related (e.g., a generic database access API). The combined weighting of all APIs may then be utilized by application analysis module 22 to make the relatedness determination.

While described as analyzing the application upon the application being made available via the online application store, application analysis module 22 may analyze applications at any time, including before or after the application is made available via the online application store. In some examples, the application may be analyzed during an application approval process. In other examples, applications already available through the online application store may be analyzed using the techniques described in this disclosure, such as upon implementing the techniques described herein in a previously existing online application store.

In various instances, an application may be analyzed and/or the relatedness determination may be updated upon a user (e.g., user 16) selecting the application via the online application store. For example, user 16 may interact with display 18 such that an online application store hosted by one of servers 12 (e.g., server 12A) is loaded and displayed. Upon loading the online application store, user 16 may select a displayed application, which may then cause application analysis module 22 to update a previous relatedness determination for the selected application. By updating the relatedness determination upon selection of an application, the relatedness determination may include additional information otherwise not available to application analysis module 22.

In one example, application analysis module 22 may include information about applications that may have been made available to the online application store after the selected application was first analyzed and/or since the relatedness determination was last made with respect to the selected application. In another example, server 12A may request user authentication information associated with user 16 when user 16 loads the online application store. Upon authenticating user 16, application analysis module 22 may gain access to information about applications previously downloaded by user 16, ratings user 16 may have applied to various applications, general application preferences as indicated by user 16, and other user-specific information, which application analysis module 22 may then include in the relatedness determination. By including the user-specific information in the relatedness determination, weightings or filters may be applied to the analyzed programmed characteristics in order to tailor the applications determined to be related more closely to the preferences of user 16.

While described as identifying related applications within a single online application store, the techniques of this disclosure may also be applied across multiple different application sources, such as two different online application stores. The techniques of this disclosure do not require control of an application store to be implemented. Rather, the techniques of this disclosure may be applied whenever access to a set of applications is available.

Furthermore, while described as displaying the results of the related application identification process to a user in an application store, the results of the related application identification process may be used in other manners. For example, a security research may identify a malicious application in an application store. The security researcher may then apply the techniques of this disclosure to identify additional applications that may be related to the malicious application. The additional applications may also be offered in the same application store as the malicious application or, in various instances, may be offered in a different application store or may not yet be offered in any application store (e.g., an application moving through an application approval process). The security research may then, for example, utilize the list of additional applications identified as being related to the malicious application to further investigate the related applications.

In this manner, application analysis module 22 may, in various instances, more accurately identify related applications based on programmed characteristics of the applications than may be achieved when relying upon metadata associated with the applications. By more accurately identifying related applications and displaying the related applications to user 16, user 16 may more easily discover these related applications within an online application store, leading to an improved user experience. Furthermore, more accurately identifying related applications may enable, in various instances, more rapid identification and removal of malicious software in an application corpus, which may reduce the impact of the malicious software experienced by users.

Techniques of this disclosure may also enable a service provider (e.g., a social networking service) to identify products or services that may be related to other products or services a user has identified or purchased, or that a person connected to the user (e.g., a friend, co-worker, acquaintance, etc. . . . ) has recommended or purchased. In this manner, the service provider may identify and recommend additional products or services that may be of interest to the user. Furthermore, another application or service provider may utilize techniques of this disclosure to identify applications and markets that may be related to products and services provided by the service provider. That is, the service provider may be able to more readily and quickly identify competitors.

Figure 2:
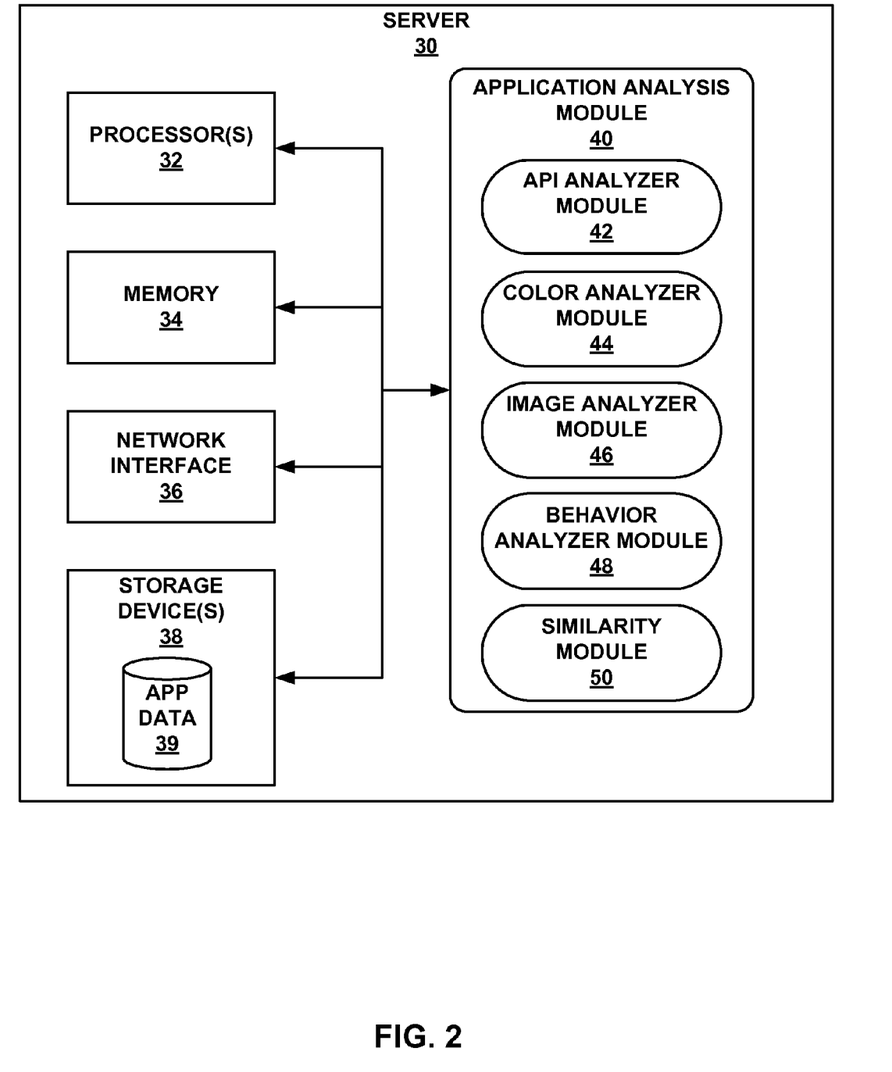
FIG. 2 is a block diagram illustrating an example server, in accordance with one or more aspects of the present disclosure.

FIG. 2 is a block diagram illustrating an example server 30, in accordance with one or more aspects of the present disclosure. Server 30 may be one example of server 12A shown in FIG. 1. As shown in the specific example of FIG. 2, server 30 includes one or more processors 32, memory 34, network interface 36, one or more storage devices 38, and application analysis module 40. Components 32, 34, 36, 38, and 40 may be interconnected via one or more buses for inter-component communications. Processors 32 may be configured to implement functionality and/or process instructions for execution within server 30. Processors 32 may be capable of processing instructions stored in memory 34 or instructions stored on storage devices 38. Server 10 may utilize network interface 36 to communicate with external devices (e.g., one or more other computing devices, such as device 10 and other servers 12 of FIG. 1) via one or more networks (e.g., network 14 of FIG. 1). For example, network interface 36 may be configured to communicate over, for example, Ethernet, transmission control protocol (TCP), Internet protocol (IP), asynchronous transfer mode (ATM), or other network communication protocols.

Memory 34 may be configured to store information within server 30 during operation. Memory 34 may, in some examples, be described as computer-readable storage medium. In some examples, memory 34 is a temporary memory, meaning that a primary purpose of memory 34 is not long-term storage. Memory 34 may also be described as a volatile memory, meaning that memory 34 does not maintain stored contents when server 30 is turned off. Examples of volatile memories include random access memories (RAM), dynamic random access memories (DRAM), static random access memories (SRAM), and other forms of volatile memories known in the art. In some examples, memory 34 may be used to store program instructions for execution by processors 32. Memory 34 may be used by software or applications running on server 30 (e.g., software required to analyze applications available through an online application store) to temporarily store information during program execution.

Storage devices 38 may also include one or more computer-readable storage media. Storage devices 38 may be configured to store larger amounts of information than memory 34. Storage devices 38 may be further configured for long-term storage of information, even when server 30 is not operating. In some examples, storage devices 38 may comprise non-volatile storage elements. Examples of such non-volatile storage elements may include magnetic hard disks, optical disks, floppy disks, flash memories, or forms of electrically programmable memories (EPROM) or electrically erasable and programmable memories (EEPROM). As shown in FIG. 2, storage devices 38 include a data repository (APP DATA) 39 configured to store application data.

Any applications implemented within or executed by server 30, e.g., application analysis module 40, may be implemented or contained within, operable by, executed by, and/or be operatively coupled to processors 32, memory 34, network interface 36, and/or storage devices 38. Application analysis module 40 may comprise a software application implemented by processors 32.

One example application analysis module 40 is shown in FIG. 2. Application analysis module 40 may be one example of application analysis module 22 shown in FIG. 1 and may perform techniques previously attributed to application analysis module 22. As shown in the example illustrated in FIG. 2, application analysis module 40 may include API analyzer module 42, color analyzer module 44, image analyzer module 46, behavior analyzer module 48, and similarity module 50. Application analysis module 40 may analyze various programmed characteristics of applications and determine whether or not certain applications are related based on the programmed characteristic analysis as well as other information. Application analysis module 40 may be software stored in memory 34 and/or storage devices 38, and may be operable by processors 32 to perform various tasks during execution. In other examples, application analysis module 40 may comprise firmware, analog circuitry, one or more processors, and/or even one of or a portion of processors 32. In any event, application analysis module 40 may enable server 30 to identify related applications for an online application store.

In general, API analyzer module 42 may determine which APIs are utilized by an application. In one example, API analyzer module 42 may decompile application binary object files to generate a version of the source code of application, which API analyzer module 42 may then analyze to identify the APIs utilized by the application. In another example, a developer provides the source code for the application in addition to or instead of a compiled binary. API analyzer module 42 then analyzes the source code provided by the developer to determine the APIs used by the application. Typically, API analyzer module 42 analyzes an application one time for each version of the application submitted to the online application store.

Color analyzer module 44 may analyze the color palette included in the graphics, images, or other visual elements of the application. Typically, applications include graphic and image files in one or more different formats, such as Graphics Interchange Format (GIF), Tagged Image File Format (TIFF), Joint Photographic Experts Group (JPEG), Portable Network Graphics (PNG), or Windows bitmap (BMP), as examples. Color analyzer module 44 may identify the image or graphic files located within the application binary or source files, identify the format of the image or graphic files, and analyze those files to identify colors included within each file. In some examples, color analyzer module 44 may group similar colors together and/or categorize colors based on various factors including, the brightness or darkness of the colors, the warmth or coolness of the colors, the types of emotions commonly associated with each colors (e.g., red may be associated with anger).

Image analyzer module 46 may analyze the content of the images included in the application. For example, image analyzer module 46 may be configured to identify elements of an image, such as text, logos, animals, trees, mountains, buildings, vehicles, weapons, or any number of other elements that may be included in the images of the application. Image analyzer module 46 may identify various elements of the image by matching elements included in the image to sample elements, such as corporate logos, included in an image repository. In some examples, image analyzer module 46 may identify particular shapes or pattern of shapes included in the image and, based on the identified shapes or patterns, identify one or more elements included in the image.

The types of images included in an application may provide insight into the type or the nature of the application. If, for example, the application includes images of weapons, trees, vehicles, and animals, the application may be a hunting game or a first-person shooter. In another example, an application may include a logo of a particular application provider (e.g., the Twitter™ bird logo). The logo or text may identify at least a portion of the functionality of the application (e.g., providing Twitter™ connectivity).

Behavior analyzer module 48 may analyze the manner in which the application operates. When analyzing the application, behavior analyzer module 48 may cause the application to execute within a controlled environment (e.g., a sandbox) such that behavior analyzer module 48 may observe application behaviors, including any calls to various network resources the application may make while executing. In one example, the controlled environment may be established by preventing the application from sending or receiving network message or from accessing certain hardware or software resources of a computing device.

In order to determine the applications' behaviors, behavior analyzer module 48 may examine errors caused by blocking access to various system or network resources or analyze the calls to the system or network resources. For example, an application may send a request for information to a well-known server using a well-known port (e.g., imap.gmail.com on port 993). Behavior analyzer module 48 may intercept the request and analyze the request to determine that the request is for particular network protocol, using a particular network port, and having a particular network destination address. By analyzing the behavior of the application, behavior analyzer module 48 may be able to identify APIs and other aspects of the application that may not be otherwise discernable. Furthermore, analyzing application behavior may be particularly useful when a programmer obfuscates or otherwise hides the source code such that a binary application may not be successfully reverse engineered.

Each of the analyzer modules 42, 44, 46, and 48 may output statistical information for each type of element considered during the respective analysis performed by the analyzer modules 42, 44, 46, and 48. The statistical information may include the number of applications that have a particular element in common (e.g., the number of applications that include a dark color palette) and/or the unique identifiers associated with each application that all share the particular element in common (e.g., the unique identifiers of all of the applications that include images of trees). In this way, analyzer modules 42, 44, 46, and 48 provide similarity module 50 with the results of the analysis performed by each of the analyzer modules 42, 44, 46, and 48.

Each of the analyzer modules 42, 44, 46, and 48 may store the results of their respective analysis in application data 39. In an example where no entries exist for the application in application data 39 because, for example, the application may be analyzed for the first time (e.g., no prior version of the application has been analyzed by application analysis module 40) or the previous entries were deleted, one or more of analyzer modules 42, 44, 46, and 48 may create new entries within application data 39 for the analyzed application. In another example where entries corresponding to the analyzed application do exist, one or more of analyzer modules 42, 44, 46, and 48 may update the existing entries with the information from the updated analysis.

In general, similarity module 50 examines the results of the analysis performed by analysis modules 42, 44, 46, and 48 to identify potentially related applications. That is, similarity module 50, in various instances, identifies related applications based on one or more of the APIs utilized by the application, the colors and images included in the application, and the behavior of the application. While not shown in FIG. 2, application analysis module 40 may include additional analyzer modules that analyze other programmed characteristics of applications. The results of the analysis performed by the additional analyzer modules may be considered by similarity module 50 in making the relatedness determinations. Similarity module 50 may also consider other information about the application, including the size of the application and conventional metadata when determining whether one or more applications may be related.

In some examples, similarity module 50 may aggregate one or more of the different types of analysis across all or a portion of the applications analyzed by application analysis module 40. As one example, similarity module 50 may aggregate the applications based on the objects detected within the images of the applications. As another example, similarity module 50 may aggregate the applications based on the colors included within the images of the applications. As yet another example, similarity module 50 may aggregate the applications based on the APIs utilized by the applications.

Upon aggregating the applications based on the various analyzed characteristics, similarity module 50 may perform additional analysis on the aggregated characteristics to identify characteristics included within the different types of analysis may provide an indicator that two or more applications that include the same characteristics may be related. In one example, similarity module 50 may analyze the number of applications that utilize each API. For APIs that are very commonly or very rarely used by the analyzed applications, application analysis module 22 may consider those APIs as outliers and remove them from a relatedness determination in an attempt to increase the accuracy of the relatedness determination.

In another example, similarity module 50 may analyze the number of applications that include each of the different identified objects within their images. Similarity module 50 may then exclude images that are included in a large percentage of the applications (e.g., over half of the applications) or images that are included in a small percentage of applications (e.g., less than one percent of the applications). That is, similarity module 50 may apply a configurable threshold to exclude outliers from the analysis in order to better identify the programmed characteristics that may be more helpful in identifying related applications. In this manner, similarity module 50 may perform statistical analysis on the results of the analysis performed by the analysis modules 42, 44, 46, and 48 to identify certain programmed characteristics that may be more likely to be included in related applications.

In accordance with one or more aspects of this disclosure, similarity module 50 may combine the results of two or more of the different types of analysis stored in application data 39. Combining the results of the different types of analysis may result in a more accurate relatedness determination that if any one of the different types of analysis are relied upon exclusively when making the relatedness determination. For example, a group of applications may all include a dark color palette as determined by color analyzer module 44. Another group of applications may all include, as one particular example, images of weapons as identified by image analyzer module 46. Yet another group of applications may all be in the largest five percent of applications based on the size of the applications. When considered individually, many applications may be identified as related even though the applications are not actually related. However, when considered together, similarity module 50 may identify a subset of each group of applications as being related because the combined subset of applications all include a dark color palette, images of weapons, and are large in size (e.g., because the combined subset of applications includes first-person shooter video games).

When making the relatedness determination, similarity module 50 may apply a weighting to each of factors included within the analysis information. For example, certain APIs may be determined to be more accurate indicators of relatedness (e.g., when specific, well-known functionality is attributed to the certain APIs). Similarity module 50 may apply a weighting to each API based on how closely each API correlates with the likelihood that two applications that each utilize the particular API are related. That is, similarity module 50 may apply a heavier weighting to APIs that are more likely to indicate that two applications are related (e.g., two applications utilizing a Twitter™ API) than to APIs that are less likely to indicate that two applications are related (e.g., a generic database access API). The combined weighting of all APIs may then be utilized by similarity module 50 to make the relatedness determination.

Similarity module 50 may also apply a weighting to each different type of analysis and/or to each of the different elements considered within each different type of analysis included in the relatedness determination. For example, if combining the results of the API analysis and the color analysis, similarity module 50 may apply a weighting factor such that the API analysis is given more weight than the color analysis when making the relatedness determination. In one example, the weighting factors may reflect how accurately each type of analysis predicts the relatedness of the applications. For example, it may be determined (e.g., by an operator) that the API analysis more accurately predicts the relatedness of application than the image analysis.

In another example, the weighting factors may reflect how accurately each element included within a particular type of relatedness analysis predicts the relatedness of the applications. That is, an API that is associated with a particular type of functionality may more accurately predict that the relatedness of certain applications may have a stronger weighting factor applied than another API that provides more generic functionality. While described as separate examples, weighting factors may be applied to both the different types of relatedness analysis and to each of the elements within the different types of relatedness analysis in a single example.

Similarity module 50 may also be configured to apply a configurable threshold when determining if an application is related to one or more other applications. Similarity module 50 may be configured to apply a first threshold the results of the different types of relatedness analysis. For example, if too many applications or too few applications are determined to share a similar color palette, similarly module 50 may apply the configurable threshold to eliminate the results of the color analysis associated with the particular color palette from consideration. As another example, the configurable threshold may relate to the number of APIs two different applications must have in common before the two applications may be determined to be related applications. In another example, the configurable threshold may relate to the total weighted relatedness calculation such that if an application has a total relatedness calculation greater than the threshold value, similarity module 50 determines that the two applications are related. In various instances, similarity module 50 may determine the relatedness of two applications along a continuum that moves from slightly related (e.g., only one API in common) to highly related (e.g., multiple APIs in common).

It is contemplated that similarity module 50 may be configured to analyze information other than the results of the analysis performed by analyzer modules 42, 44, 46, and 48. For example, similarity module 50 may be configured to analyze applications other users purchased who also purchased the application at issue (e.g., the application selected by the user and displayed to the user). That is, in some instances, if one application is frequently purchased by a user who also purchases the application at issue, similarity module 50 may be more likely to determine that the two applications are related even though similarity module 50 may not have otherwise determined that the two applications are related based on the results of the analysis performed by analysis modules 42, 44, 46, and 48. In another example, similarity module 50 may be configured to include information about applications previously downloaded by a user, ratings the user may have applied to various applications previously downloaded by the user, general application preferences as indicated by the user, and other user-specific information when making the relatedness determination. By including the user-specific information in the relatedness determination, weightings or filters may be applied to the analyzed programmed characteristics in order to tailor the applications determined to be related more closely to the preferences of the user.

Figure 3:
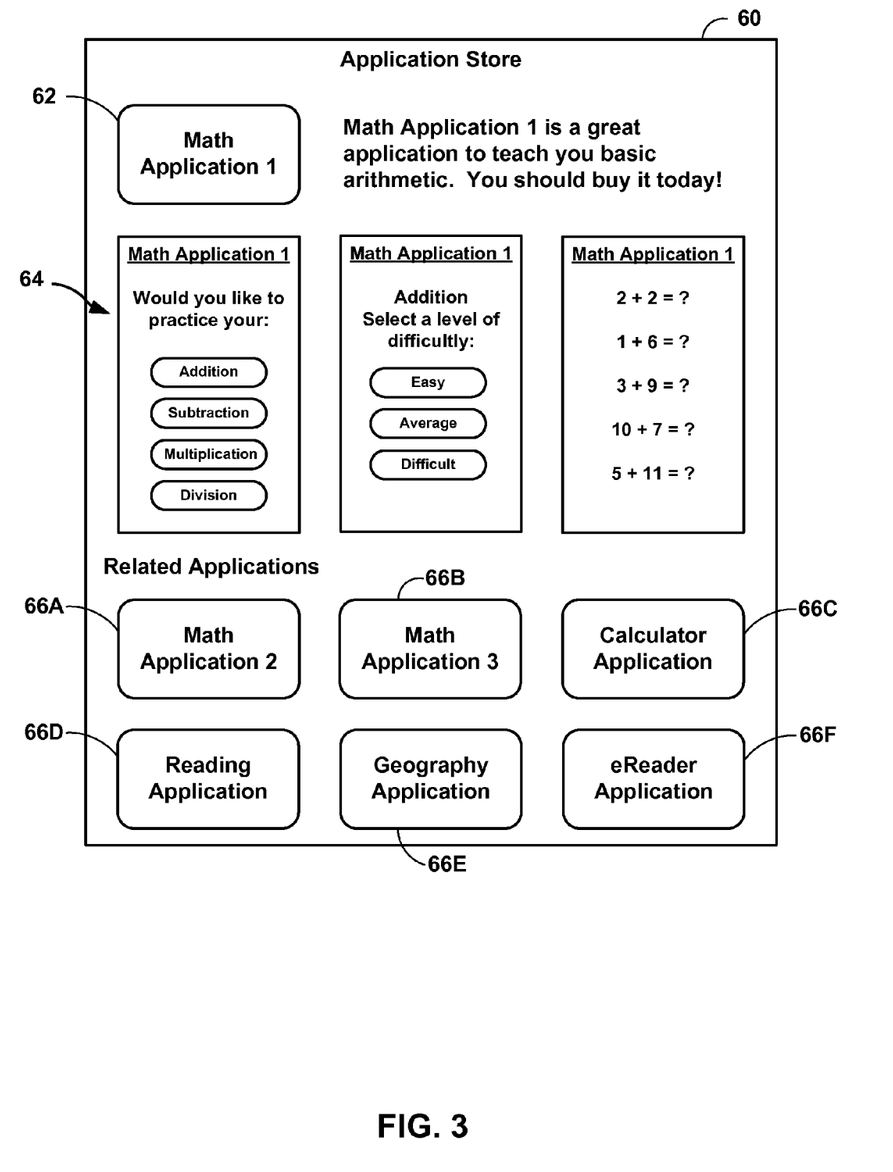
FIG. 3 is a screen illustrating an example user interface for displaying a selected application and related applications, in accordance with one or more aspects of the present disclosure.

FIG. 3 is a screen diagram illustrating an example user interface for displaying a selected application and related applications, in accordance with one or more aspects of the present disclosure. For purposes of illustration, the example user interface is described below within the context of example system 2 of FIG. 1 and server 30 of FIG. 2, and may be generated by display 18 of device 10 of FIG. 1.

As illustrated in FIG. 3, user interface 60 includes a selected application 62, example screen shots 64 of selected application 62, and related applications 66A-66F (collectively, "related applications 66").

Selected application 62 is the application selected by a user (e.g., user 16 of FIG. 1) as the application at issue. That is, upon user 16 selecting an application by, for example, clicking or tapping on the desired application, server 30 causes display 18 of device 10 to output user interface 60 and selected application 62. In some examples, screen shots 64 are example screen illustrations generated by selected application 62. Screen shots 64 may provider user 16 with a preview of the functionality and design of selected application 62 when selected application 62 is executed or otherwise operational. As shown in FIG. 3, screen shots 64 illustrate certain aspects of the math-related functionality that may be provided by selected application 62.

Related applications 66 are examples of applications determined to be related to selected application 62 by application analysis module 40 of server 30. In one example, related applications 66 may include applications determined to be related to each other at some earlier time (e.g., when each application was added to an application database). In another example, related applications 66 may include applications determined to be related to each other by application analysis module 40, as one example, after user 16 selected the selected application 62, but prior to user interface 60 being presented to user 16. That is, application analysis module 40 may determine if one or more applications are related on demand. In other words, when user 16 selects the selected application 62, similarity module 50 may examine the results of analysis performed by analysis modules 42, 44, 46, and 48 to identify related applications. By identifying the related applications on demand, related applications 66 may, in one or more aspects, be continuously updated as new applications are uploaded to server 30.

As shown in FIG. 3, related applications 66 includes two additional math applications (related applications 66A and 66B), a calculator application (related application 66C), a reading application (related application 66D), a geography application (related application 66E), and an eReader application (related application 66F). Application analysis module 40 may have identified related applications 66 as being related using the techniques described above. For example, related applications 66A and 66B may have been determined to be related to the selected application because related applications 66A and 66B utilize similar mathematic APIs as those utilized by selected application 62. As another example, related applications 66D and 66E may have been determined to be related to selected application 62 by similarity module 50 because other users who have downloaded selected applications 62 also downloaded related applications 66D and 66E. While illustrated as including six related applications, any number of related applications may be included in user interface 60. The number of related applications included in user interface 60 may be determined by a user-specific configuration variable or by a configuration parameter of server 30.

Figure 4:
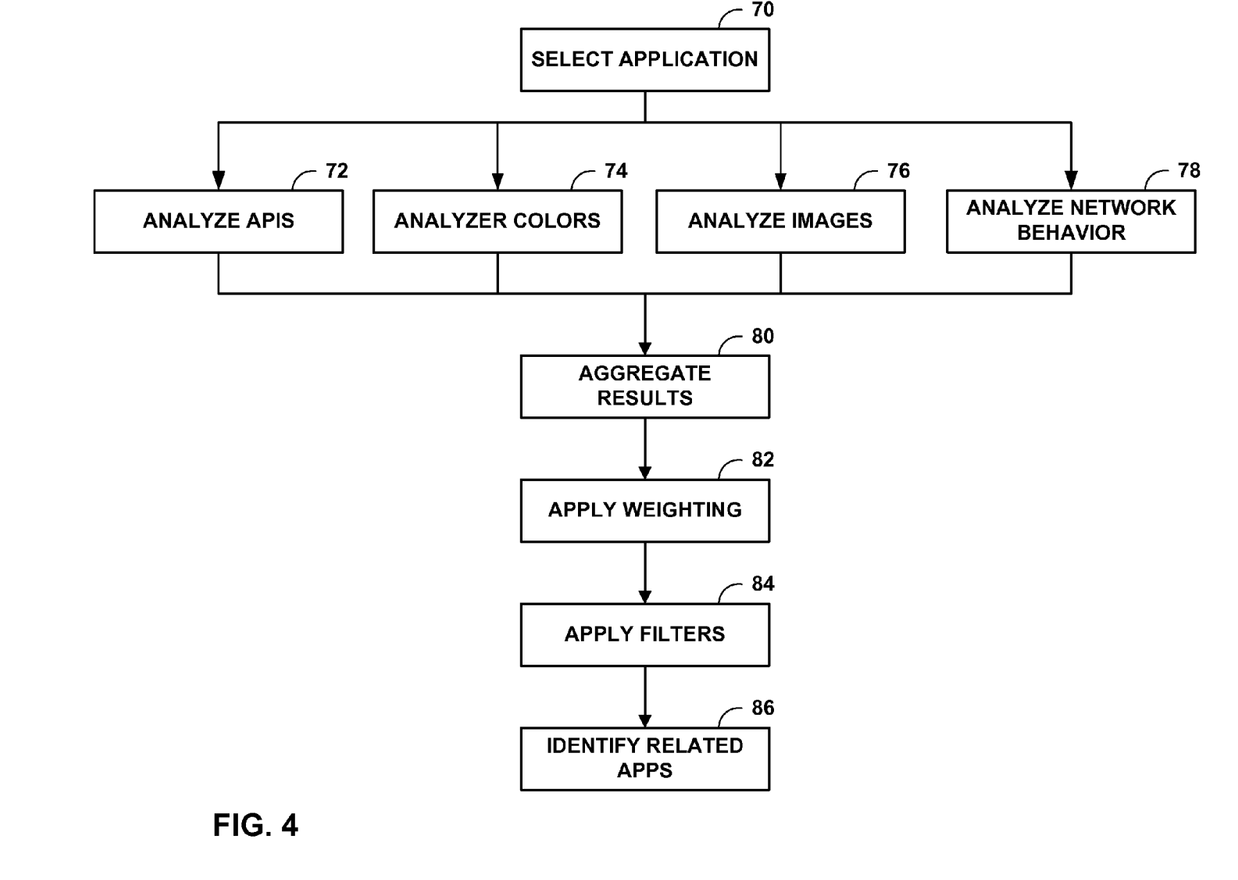
FIG. 4 is a flowchart illustrating an example method for identifying related applications, in accordance with one or more aspects of the present disclosure.

FIG. 4 is a flowchart illustrating an example method for identifying related applications, in accordance with one or more aspects of the present disclosure. For purposes of illustration only, the example method is described below within the context of system 2 of FIG. 1 and server 30 of FIG. 2, though various other systems and/or devices may be utilized to implement or perform the method shown in FIG. 4. In the example illustrated in FIG. 4, server 30 selects an application that will be analyzed by server 30 (70). In one example, a developer may upload the application to server 30. In another example, server 30 may be configured to periodically update the analysis of previously received application such as, for example, when additional applications are uploaded to server 30. In another example, server 30 may perform a portion or all of these acts upon receiving an identifier of an application selected by user 16 (e.g., upon user 16 selecting an application in user interface 24).

Upon selecting the application to analyze (70), application analysis module 40 of server 30, as one example, may analyze various aspects of the selected application. For instance, API analyzer module 42 may analyze the APIs included in the selected application (72) using the techniques described above. Similarly, color analyzer module 44 may analyze the colors included in the graphics, images, or other visual elements of the selected application (74), image analyzer module 46 may analyze the images included within the selected application (76), and behavior analyzer module 48 may analyze the network behavior of the selected application (78). While illustrated as being performed in parallel, the analysis performed by analysis modules 42, 44, 46, and 48 may be performed serially or in parallel or some combination thereof. In certain examples, one or more types of analysis may not be performed (e.g., one or more of acts 72, 74, 76, and 78 may be skipped). Typically, at least one analysis act is performed by server 30 upon server 30 receiving an application. However, in some examples, the analysis may be performed by server 30 upon user 16 selecting an application (e.g., for display in example user interface 60 of FIG. 3).

The results of the analysis acts 72, 74, 76, and 78 may include information about what APIs are utilized by the selected application, what colors are included in the selected application, what images are included in the selected application, and what network calls are made by the selected application. The analysis results may be stored in a data repository (e.g., application data 39 of FIG. 2) for future analysis by similarity module 50.

Similarity module 50 aggregates the results of each type of analysis performed on the selected application with the results of similar types of analysis performed on one or more other applications (80). For example, similarity module 50 aggregates the results of the API analysis performed on the selected application with the results of the API analysis performed on one or more other applications. The aggregated results include statistical information about the set of applications included in the aggregated results, such as a number of applications that utilize a particular API or that include a particular color palette, for instance. Upon aggregating the results, similarity module 50 applies one or more weighting factors to each of the aggregated results (82) in order to balance the analysis results or otherwise alter the amount of impact each of the analysis results has upon the final relatedness determination.

Whether or not similarity module 50 applies weighting factors to the aggregated results, similarity module 50 may apply various filters (e.g., thresholds) to the aggregated results (84). The filters may exclude analysis results that are deemed to be less useful in making the relatedness determination because, for example, too many or too few applications have similar characteristics. The filters may also exclude applications that do not include enough similarities to be deemed related to the selected application. Similarity module 50 then identifies the remaining applications as being related to the selected application (86). In some examples, similarity module 50 stores an indication of which applications are determined to be related to which other applications in a data repository. In other examples, similarity module 50 causes the related applications to be outputted to user 16 via display 18 of device 10.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, other solid state memories, magnetic or optical data storage media, and the like. The techniques additionally, or alternatively, may be realized at least in part by a computer-readable communication medium that carries or communicates code in the form of instructions or data structures and that can be accessed, read, and/or executed by a computer. In some examples, an article of manufacture may comprise one or more computer-readable storage media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in a RAM or cache).

The code or instructions may be software and/or firmware executed by processing circuitry including one or more processors, such as one or more digital signal processors (DSPs), general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments of the disclosure have been described. These and other embodiments are within the scope of the following claims.

The invention claimed is:

1. A method comprising:
   selecting for analysis, by a computing device, an application;
   monitoring, by the computing device, at least one of network behavior and system behavior of the application during execution of the application within a controlled environment;
   identifying, based at least in part on at least one of the network behavior and the system behavior of the application, a group of application programming interfaces utilized by the application during execution;
   determining, by the computing device and based on the group of application programming interfaces, that the application is undesired;
   identifying a group of related applications that are each related to the application based on the group of application programming interfaces utilized by the application, wherein each related application of the group of related applications utilizes one or more application programming interfaces of the group of application programming interfaces utilized by the application, and wherein each related application of the group of related applications are available for download from an online application store that provides an interface for a plurality of mobile computing devices to download applications executable by the plurality of mobile computing devices; and
   removing, from the online application store, the group of related applications.

2. The method of claim 1, further comprising:
   receiving, from a mobile computing device of the plurality of mobile computing devices, an indication of a selected application executable by the mobile computing device, wherein an identifier uniquely identifies the selected application, and wherein the selected application is available for download from the online application store and was selected using the interface provided by the online application store;
   retrieving, from a data repository, a group of applications identified as being related to the selected application based on the identifier that uniquely identifies the selected application, wherein applications of the group of application identified as being related to the selected application are available for download from the application store; and
   outputting identifiers for each of the applications of the group of applications to the mobile computing device.

3. The method of claim 1, further comprising:
   identifying a group of images included in the application that are displayed during execution of the application by the computing device;
   identifying a second group of related applications that are each related to the application based on the group of images, wherein each related application of the second group of related applications includes one or more images similar to the group of images.

4. The method of claim 1, further comprising:
   identifying a group of colors included in the graphics, images, or other visual elements of the application;
   identifying a second group of related applications that are each related to the application based on the group of colors included in the application, wherein each related application of the second group of related applications includes a group of colors in the graphics, images, or other visual elements similar to the group of colors included in the graphics, images, or other visual elements of the application.

5. The method of claim 1, further comprising:
   applying a filter to the group of application programming interfaces utilized by the application, wherein the filter removes at least one application programming interface from being used in identifying the group of related applications when the at least one application programming interface is utilized by a number of the group of related applications that is greater than a first threshold value or when the at least one application programming interface is utilized by another number of the group of related applications that is less than a second threshold value.

6. The method of claim 1, wherein identifying the group of related applications further comprises:
   determining a number of application programming interfaces utilized by each related application of the group of related applications; and
   determining a degree of relatedness for each related application of the group of related applications based on the number of application programming interfaces utilized by each application.

7. The method of claim 6, wherein identifying the group of related applications further comprises:
   identifying a group of colors included in the graphics, images, or other visual elements of the application; and
   determining a second degree of relatedness for each related application of the group of related applications based on the group of colors.

8. The method of claim 7, further comprising:
   applying a first weighting factor to the degree of relatedness determined based on the application programming interfaces and applying a second weighting factor to the second degree of relatedness identified based on the group of colors in order to determine a weighted relatedness factor for each application in the group of related applications.

9. The method of claim 8, further comprising:
   applying a filter to the weighted relatedness factor, wherein the filter removes applications from the group of related applications when the weighted relatedness factor is less than a threshold value.

10. The method of claim 6, wherein identifying the group of related applications further comprises:
    identifying a group of images included in the application that are displayed during execution of the application by the computing device; and
    determining a second degree of relatedness for each related application of the group of related applications based on the group of images.

11. The method of claim 10, further comprising:
    applying a first weighting factor to the degree of relatedness determined based on the application programming interfaces and applying a second weighting factor to the second degree of relatedness identified based on the group of images in order to determine a weighted relatedness factor for each application in the group of related applications.

12. The method of claim 11, further comprising:
applying a filter to the weighted relatedness factor, wherein the filter removes applications from the group of related applications when the weighted relatedness factor is less than a threshold value.

13. The method of claim 1, further comprising:
storing, in a data repository of the computing device, an indication of an association between the application and each related application of the group of related application.

14. The method of claim 1, further comprising:
removing the application from the online application store based on the application being identified as undesired.

15. The method of claim 1, further comprising:
removing one of the group of related applications from the online application store based on similarity to a previously removed application.

16. The method of claim 1, wherein identifying the group of related applications further comprises:
determining the size of the application; and
identifying the group of related applications that are each related to the application based on determined size of the application and the size of each of the group of related applications.

17. The method of claim 1, further comprising:
assigning a relatedness factor value to each application programming interface of the group of application programming interfaces, wherein the relatedness factor value is based at least in part on a likelihood that different applications that each utilize the respective application programming interface are related to each other; and
wherein identifying the group of related applications that are each related to the application is based at least in part on the relatedness factor value assigned to each application programming interface of the group of application programming interfaces utilized by the application.

18. A computer-readable storage medium encoded with instructions for causing one or more programmable processors of a computing system to:
select for analysis, by the computing system, an application;
monitor, by the computing system, at least one of network behavior and system behavior of the application during execution of the application within a controlled environment;
identify, based at least in part on at least one of the network behavior and the system behavior of the application, a group of application programming interfaces utilized by the application during execution;
determine, based on the group of application programming interfaces, that the application is undesirable;
identify a group of related applications that are each related to the application based on the group of application programming interfaces utilized by the application, wherein each related application of the group of related applications utilizes one or more application programming interfaces of the group of application programming interfaces utilized by the application, and wherein each related application of the group of related applications are available for download from an online application store that provides an interface for a plurality of mobile computing devices to download applications executable by the plurality of mobile computing devices; and
remove, from the online application store, the group of related applications.

19. A computing system comprising:
one or more programmable processors;
an application analysis module executable by the one or more programmable processors to select an application for analysis, and monitor at least one of network behavior and system behavior of the application during execution of the application within a controlled environment, identify, based at least in part at least one of the network behavior and the system behavior of the application, a group of application programming interfaces utilized by the application during execution, determine, based on the group of application programming interfaces, that the application is undesired, identify a group of related applications that are each related to the application based on the group of application programming interfaces utilized by the application, wherein each application of the group of related applications utilizes one or more application programming interfaces of the group of application programming interfaces utilized by the application, and wherein each related application of the group of related applications are available for download from an online application store that provides an interface for a plurality of mobile computing devices to download applications executable by the plurality of mobile computing devices, and remove, from the online application store, the group of related applications.

* * * * *